US006482493B1

(12) United States Patent
Kim

(10) Patent No.: US 6,482,493 B1
(45) Date of Patent: Nov. 19, 2002

(54) OPTICAL DISC AND METHOD AND APPARATUS OF FABRICATING MASTER DISC FOR THE SAME

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/285,265

(22) Filed: Apr. 2, 1999

(30) Foreign Application Priority Data

Apr. 4, 1998 (KR) .......................................... P98-11975

(51) Int. Cl.[7] ................................................ B32B 3/02
(52) U.S. Cl. ...................... 428/64.1; 428/64.4; 428/913; 430/270.11; 430/321; 430/945; 369/275.1; 264/1.37
(58) Field of Search ............................... 428/64.1, 64.2, 428/64.4, 913; 430/270.11, 320, 321, 945; 369/275.1; 264/1.33, 1.37

(56) References Cited

U.S. PATENT DOCUMENTS 5,843,626 A * 12/1998 Ohta ........................... 430/220
6,071,586 A * 6/2000 Ro .............................. 428/64.1

FOREIGN PATENT DOCUMENTS

| JP | 2-30748 | 8/1973 |
| JP | 5-290411 | 11/1993 |
| JP | 05-290411 | * 11/1993 |
| JP | 6-103613 | 4/1994 |
| JP | 0A6-1033613 | * 4/1994 |
| JP | 2-321164 A1 | 11/1994 |

* cited by examiner

Primary Examiner—Elizabeth Evans
(74) Attorney, Agent, or Firm—Birch, Stewart, Kolasch & Birch, LLP

(57) ABSTRACT

An optical disc capable of being high a recording density. On the optical disc, there is provided a pit having a width large relative to a length. The width of the pit is larger than the length of the pit so that the optical disc is high in the recording density.

13 Claims, 12 Drawing Sheets

OPTICAL DISC AND METHOD AND APPARATUS OF FABRICATING MASTER DISC FOR THE SAME

BACKGROUND OF THE INVENTION

1. Field of the Invention

This invention relates to an optical disc allowing information to be recorded and/or reproduced optically thereon. Also, the present invention relates to a method and apparatus for fabricating a master disc to be used for forming the optical disc.

2. Description of the Prior Art

Generally, the optical disc is formed from a master disc by copying. The master disc is provided by a photolithography. In detail, a photo resist film is formed on a substrate. The photo resist film is exposed to a laser beam switched by an exposure pulse. The exposed photo resist film is developed by a developer to produce the master disc with pre-pits thereon. The pre-pits formed on the master disc have a difference length according to a period in which the laser beam is irradiated on the photo resist film. The irradiating period of the laser beam varies with the width of the exposure pulse. Consequently, the length of each pre-pit is determined by the width of the exposure pulse, as shown in FIG. 2. For example, first and second pre-pits of short length are formed by the laser beam being irradiated on the photo resist film during the exposure periods of 3 T and 4 T, while fourth pre-pit of longer length is defined by which the laser beam is irradiated on the photo resist film in the exposure period of 10 T. The pre-pits formed as above is inverted and transcribed to provide a stamper to be installed into a disc molder. The disc molder receives a molten substrate material toward the stamper and allows the molten substrate material toward the stamper to be cooled, thereby forming a disc substrate. On the disc substrate, pre-pits having a shape equal to them on the master disc are formed. Finally, a reflective film and a protective film for preventing the deterioration of the reflective film are sequentially disposed on the disc substrate to produce the optical disc. Such a process of fabricating the optical disc is adapted to a read only optical disc such as CD-ROM and DVD-ROM, an once writable disc such as CD-R, DVD-R and so on, and a rewritable disc such as CD-RW, DVD-RW and so on.

Also, the recording area of a writable optical disc has concentric tracks, one or two spiral track. The tracks are formed in the structure of a land and groove allowing a trace control to be accurately performed. The land and groove tracks are formed by the process described as above, as well as the pre-pits.

Further, the optical disc is gradually higher in the recording density to record a great amount of information such as a moving picture. Actually, the CD has a track pitch of 1.6 $\mu$m and a minimum pit length of 0.69 $\mu$m, whereas the DVD large relative to the CD in the recording capacity has a track pitch of 0.74 $\mu$m and a minimum pit length of 045 $\mu$m. This represents that the recording density of the DVD is very higher than that of the CD. In order to enlarge the recording density of the optical disc, these are researched and developed methods using a light source of short wavelength such as a blue laser and increasing the aperture of an objective lens. Since the track pitch and pit length of the optical disc is gradually small, as the recording density is higher, the fabrication of the master disc requires a high accurate.

However, the width of the exposure pulse, i.e., the irradiating period of the laser beam varies the width of the pre-pit as well as the length of the pre-pit. In real, the pre-pit 7 of a long length created by a exposure pulse having a width of 10 T is large relative to the pre-pits 1 and 3 of short length formed by the exposure pulse each having width of 3 T and 4 T, in the width. This results from that the power of the laser beam to be irradiated on the photo resist film is relative to the width of the exposure pulse. Actually, the laser beam is light when the width of the exposure pulse is small, while the laser beam becomes powerful as the width of the exposure pulse is enlarged. By the laser beam, the width of the pre-pit is gradually extended until the length of the pre-pit is arrived at 5 T, and is maintained constantly when the length of the pre-pit is at least 5 T. The variation of the width of the pre-pit is enlarged more and more as the recording density becomes higher. Due to this, the laser beam responding to the exposure pulse can not form the pre-pit having a desired width and length, as the recording density is higher. Also, since the pre-pit is smallest, as the recording density is higher, a reproducing signal capable of reproduction can not detected. As a result, errors are generated in the signal reproduced from the optical disc having a high recording density. The reproducing error makes the pre-pit have at least critical length and the optical disc have not a high recording density.

SUMMARY OF THE INVENTION

Accordingly, it is an object of the present invention to provide an optical disc having a high recording density.

Another object of the present invention provides a method and apparatus of fabricating a master disc which are used for the fabrication of an optical disc having high recording density.

In order to achieve these and other objects of the invention, an optical disc according to an aspect of the present invention is provided with a pit having a width which is larger relative to a length.

A method of fabricating a master disc according to another aspect of the present invention comprises steps of: providing a substrate; forming a photo resist film on the substrate; and exposing repeatedly the photo resist film at least twice to form one track on the substrate.

A method of fabricating a master disc according to another aspect of the present invention comprises steps of: providing a substrate; forming a photo resist film on the substrate; and exposing simultaneously the photo resist film to at least two lights to form one track on the substrate.

A method of fabricating an optical disc according to another aspect of the present invention comprises steps of: providing a master disc produced by the master disc fabricating method as described above; transcribing a master disc to provide a stamper; and molding a disc substrate using the stamper.

An apparatus for fabricating a master disc according to still another aspect of the present invention comprises exposing means for performing repeatedly an exposure of a photo resist film at least twice to form one track.

An apparatus for fabricating a master disc according to still another aspect of the present invention comprises: light means for generating laser lights; processing means for forming a channel bit stream from an exposure data; modulating means for switching the laser lights in response with the channel bit stream; information generating means for obtaining a rotating information in accordance with the rotation of the substrate; and light deflective means for moving the axis of the laser lights toward any one of inner and outer circumference on the substrate responding to the rotating information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
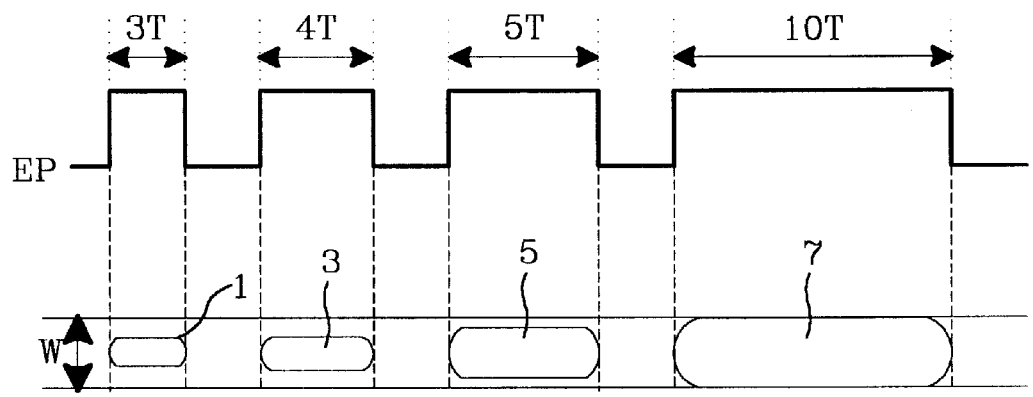
FIG. 1 depicts a pre-pit train formed on a conventional master disc.
Figure 2:
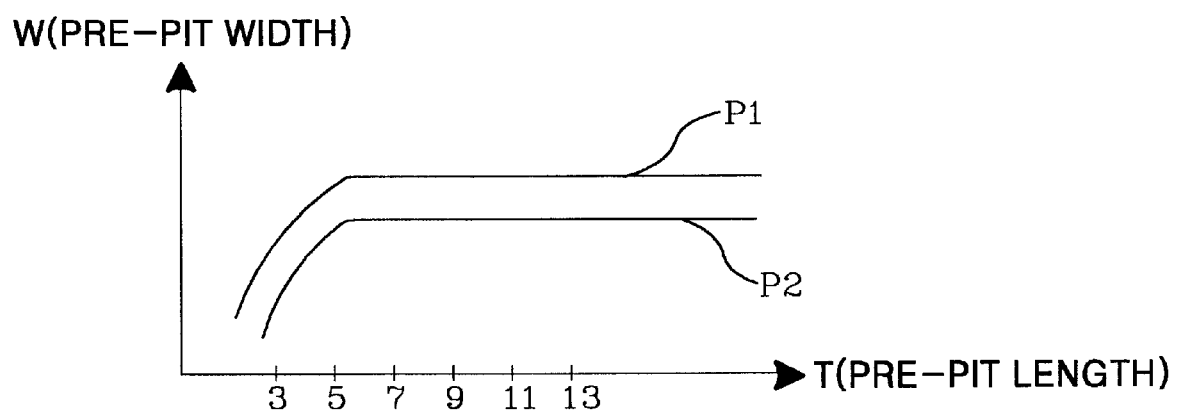
FIG. 2 represents a characteristic of the width of a pit with respect to the length of the pit formed by laser beam.
Figure 3:
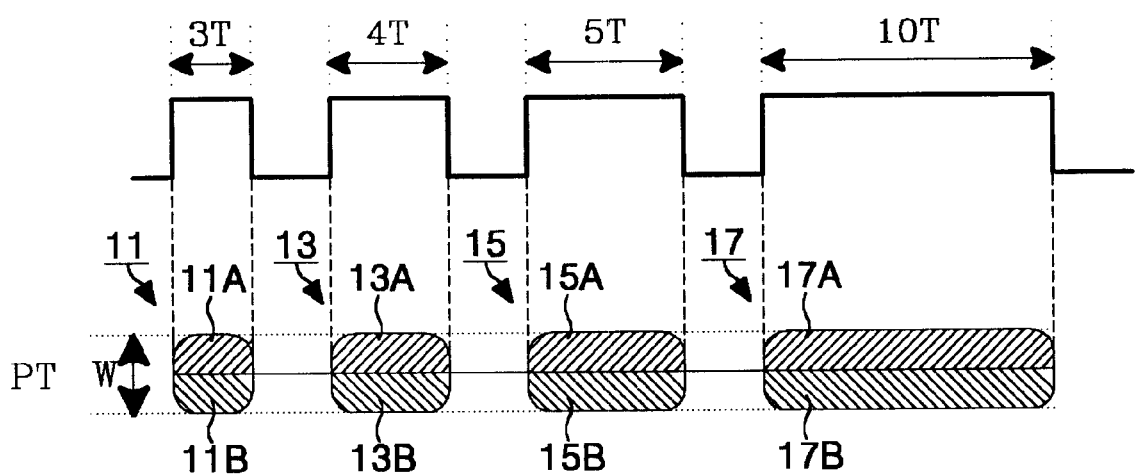
FIG. 3 depicts a pre-pit train formed on a master disc according to the present invention.

FIG. 3 depicts a pre-pit train formed on a master disc according to the present invention. The pre-pit train of FIG. 3 includes first through fourth pre-pits each having a constant width regardless to its length. Each of first through fourth pre-pits are formed by double-scanning with a light spot which has a diameter corresponding to a track width of 1/2 and is switched in accordance with a exposure pulse EP. In detail, the light spot having the diameter of 1/2 track pitch is switched in accordance with the exposure pulse EP so that first through fourth upper pits 11A, 13A, 15A and 17A are formed. Also, first through fourth lower pits 11B, 13B, 15B and 17B are produced by re-scanning with the light spot which is switched in accordance with the exposure pulse EP.

Each upper pit 11A, 13A, 15A and 17A are formed at position adjacent to each lower pit 11B, 13B, 15B and 17B such that the first through fourth pits have the constant width regardless to the length. In order to fabricate the master disc having the first through fourth pre-pits 11, 13, 15 and 17, a photo resist film is formed on a substrate. The light spot having the diameter corresponding to the track pitch of 1/2 is irradiated along with the proceeding direction of the track from the start point of the photo resist film in such a manner of switching according to the exposure pulse EP, thereby forming the first through fourth upper pits 11A, 13A, 15A and 17A at the upper half portion of the track. Then, the light spot having the diameter corresponding to the track pitch of 1/2 is re-irradiated along with the proceeding direction of the track from the start point of the photo resist film in such a manner of switching according to the exposure pulse EP, thereby providing the first through fourth lower pits 11B, 13B,15B and 17B at the lower half portion of the track. The first through fourth lower pits 11B, 13B, 15B and 17B is adjacently positioned with the first through fourth upper pits 11A, 13A, 15A and 17A in the width direction of the track to provide a pit train pattern having pits of equal width. In the pit train pattern, the first through fourth pits 11, 13, 15 and 17 each have a length of 3 T, 4 T, 5 T or 10 T corresponding to the width of the exposure pulse EP.

The pre-pits formed on the substrate as above is inverted and transcribed to provide a stamper to be installed into a disc molding apparatus. The disc molding apparatus receives a molten substrate material toward the stamper and allows the molten substrate material received toward the stamper to be cooled, thereby forming a disc substrate. On the disc substrate, pre-pits having a shape equal to them on the master disc are formed. A recording layer, a reflective film, a protective film and so on are sequentially disposed on the disc substrate to produce the an optical disc. Such an optical disc can include a pit having the width larger than the length, i.e., the first pre-pit 11. In other words, the first pre-pit 11 created by a narrow width of the exposure pulse can have a width larger than a length. The large pit having the width larger than the length increases the reflective light amount relative to a narrow pit having a width narrow than a length and the length equal to that of the large pit. To this end, a signal having level sufficient to be reproduced is obtained from the pit having the large width relative to the length. In this view point, the length of pits formed on the optical disc can be optimized, and furthermore an optical disc of high recording density can be implemented. In the case that land and groove tracks is provided to an optical disc as a recording area, the land or groove track is formed by exposing repeatedly at least 2 times, equal to the pre-pit train PT. On the other hand, the pre-pit train PT is formed by the repeatedly exposing, while the land or groove track can be produced by exposing once, equal to the conventional pre-pit train.

Figure 4:
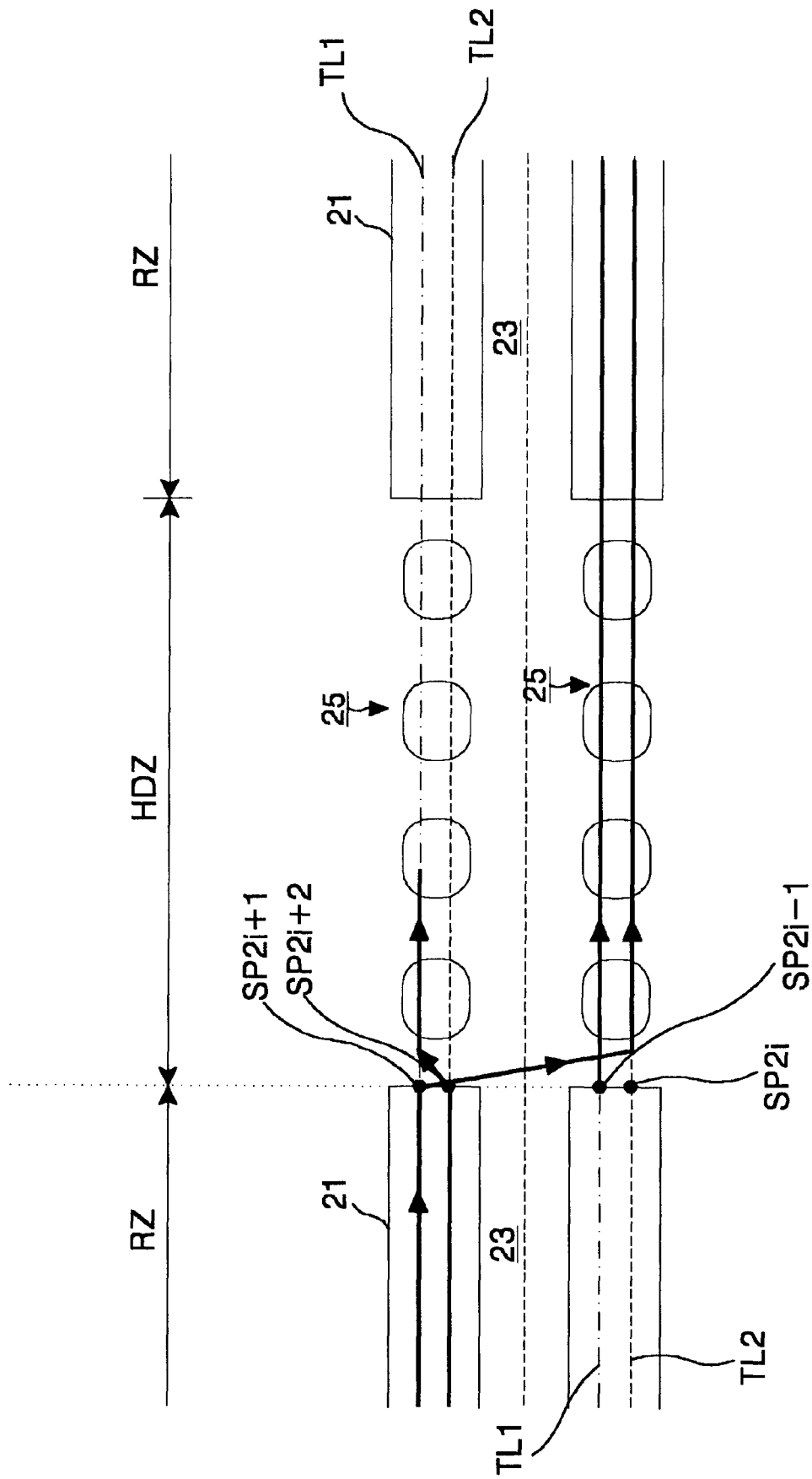
FIG. 4 shows the track structure of an optical disc according to an embodiment of the present invention.
Figure 5:
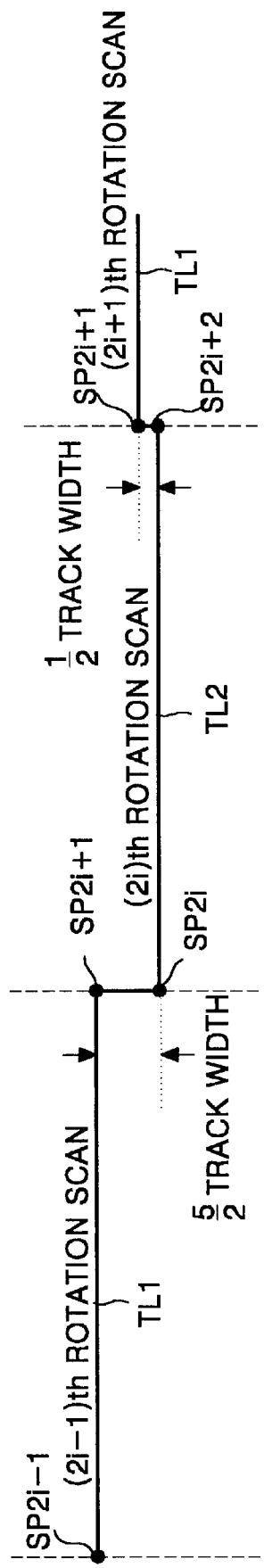
FIG. 5 explains a scanning path of a light spot to be irradiated on an exposure plane when the optical disc of FIG. 4 is fabricated.
Figure 6:
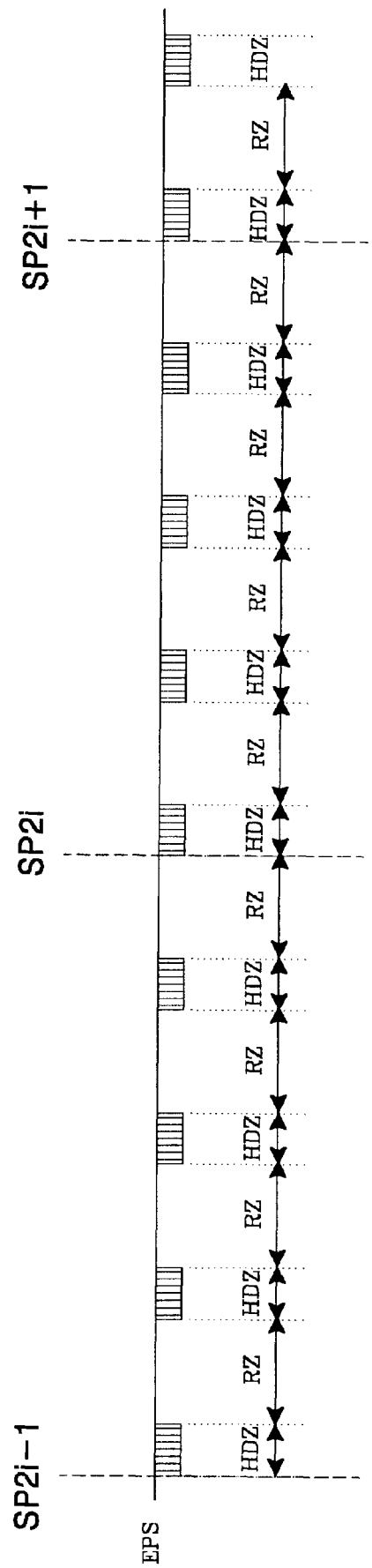
FIG. 6 represents the waveform of an exposure pulse used to the fabrication of the optical disc having a header area.

FIG. 4 illustrates an optical disc according to an embodiment of the present invention. The optical disc of FIG. 4 includes land and groove tracks 21 and 23 of spiral shape formed side by side. Among the land and groove tracks 21 and 23, the land track 21 is utilized as a recording area RZ for recording a user information thereon, whereas the groove track 23 guides a light beam. The land track 21 is alternated with a pre-pit train 24 in a track direction (in the circumferential direction). The pre-pit train 25 is formed along the central line of the land track 21. The pre-pit train 25 is used as a header area HDZ for indicating the physical position of the recording area RZ because of including an identification information representing the physical position of the land track 21, i.e., the recording area RZ. In the pre-pit train 25, it is included pre-pits, such as first pre-pit 11 of FIG. 3, having a width larger than a length. In the other words, the length of the pre-pit is short, while the width of the pre-pit is extended. To this end, the optical disc of FIG. 4 has a high recording density. In order to fabricate such an optical disc, a double exposing is employed at the formation of a master disc. The double exposing allows a light spot to be scanned by two rotation at a photo resist film coated on a substrate, thereby forming land tracks 21 and pre-pit trains 25 for one track. The double exposing enables the light spot to move by 5/2 track widths toward an inner circumference when an odd rotation scan is terminated. Also, when an even rotation scan is terminated, the double exposing moves the light spot by 1/2 track width toward an outer circumference. At the odd rotation scan, the light spot proceeds along first scanning line being away from the outer circumference of the land track 21 toward the outer track apart TL1 by 1/4 track width. Whereas, the light spot follows second scanning line TL2 being away from the outer circumference of the land track 21 toward an inner track by 3/4 track width. The scanning path of the light spot can be explained as shown in FIG. 5. Actually, when ith and i+1th tracks are formed, the light spot goes along the first scanning line TL1 from a 2i−1th start point ST2i−1 to 2i+1th start point ST2i+1 to complete a 2i−1th rotation scan. In the case of completing the 2i−1th rotation scan, the light spot moves from the 2i+1 start point ST2i+1 to a 2ith start point ST2i. In other words, the light spot moves toward the inner track by 5/2 track width. Then, the light spot is irradiated along the second scanning line TL2 from the 2ith start point ST2ii to a 2i+2th start point ST2i+2 to complete the 2ith rotation scan. By the double rotation scan, the ith land and groove tracks 21 and 23 are patterned. After the 2ith rotation scan, the light spot moves toward the outer track by a 1/2 track width and allows a 2i+1th rotation scan to be started. While the two rotation scan is performed, the light spot is switched according to an exposure pulse EPS as shown in FIG. 6. Referring to FIG. 6, the exposure pulse EPS has alternatively high and low logic values in the header area HDZ, whereas maintains only the high logic value in the recording area RZ. To this end, the light spot also is intermittently irradiated on the photo resist film corresponding to the header area HDZ, while continuously irradiated on the photo resist film relative to the recording area RZ. such a light spot irradiated on the photo resist film is switched, thereby providing the land and groove tracks 21 and 23 and the pre-pit train 25.

Figure 7:
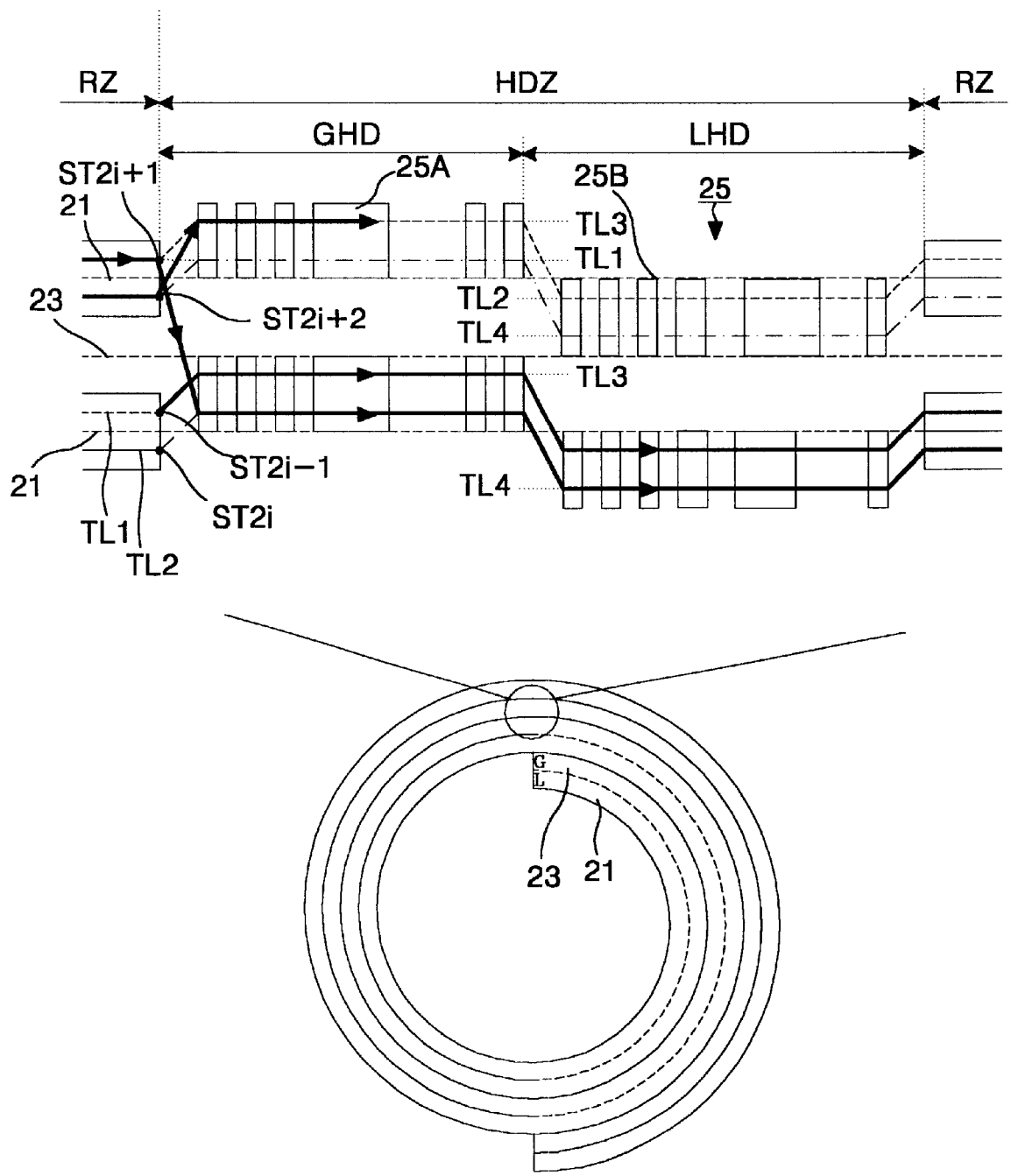
FIG. 7 shows the track structure of an optical disc according to another embodiment of the present invention.
Figure 8:
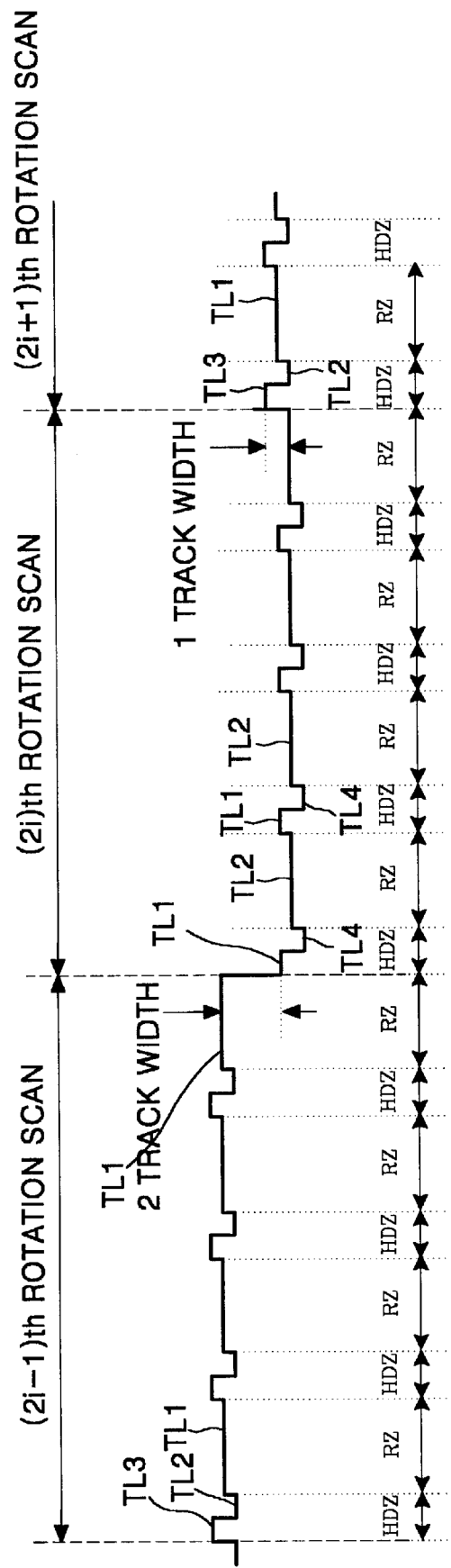
FIG. 8 explains a scanning path of a light spot to be irradiated on an exposure plane when the optical disc of FIG. 7 is fabricated.

FIG. 7 shows an optical disc according to another embodiment of the present invention. The optical disc of FIG. 7 includes land and groove tracks 21 and 23 of spiral shape formed side by side. All of the land and groove tracks 21 and 23 are utilized as a recording area RZ for recording a user information thereon. The land and groove tracks 21 and 23 each are alternated with a pre-pit train 25 in a track direction. The pre-pit train 25 consists of first pre-pit train 25A for the land track 21 and second pre-pit train 25B for the groove track 23. The first pre-pit train 25A is formed along an outer boundary line of the land track 21, while the second pre-pit train 25B is positioned along an inner boundary line of the land track 21. The first and second pre-pit trains 25A and 25B is used as a header area HDZ for indicating the physical position of the recording area RZ because of including an identification information representing the physical position of the land and groove tracks 21 and 23, i.e., the recording area RZ. In detail, an area including the first pre-pit train 25A is called as a groove header area GHD, and another area formed with the second pre-pit train 25B is called as a land header area LHD. In the pre-pit train 25, it is included pre-pits, such as first pre-pit 11 of FIG. 3, having a width larger than a length. In the other words, the length of the pre-pit is short, while the width of the pre-pit is extended. To this end, all the land and groove tracks 21 and 23 on the optical disc of FIG. 7 has a high recording density. In order to fabricate such an optical disc, a double exposing is employed at the formation of a master disc. The double exposing allows a light spot to be scanned by two rotation at a photo resist film coated on a substrate, thereby forming land tracks 21 and pre-pit trains 25 for one track. The double exposing enables the light spot to move by 5/2 track widths toward an inner circumference when an odd rotation scan is terminated. When an even rotation scan is terminated, the double exposing moves the light spot by 1/2 track width toward an outer circumference. Also, the double exposing allows the light spot to move by 1/2 track width toward outer circumference in the case that the light spot proceeds from the land track 21 into the groove header area GHD and from the land header area LHD into the land track 21. On the other hand, the light spot moves by 1 track width toward inner circumference when the light spot enters from the groove header area GHD into the land header area LHD. If the header area HDZ is positioned ahead the recording area RZ, the double exposing enables the light spot to move by 2 track width toward an inner circumference when an odd rotation scan is terminated, and by 1 track width toward an outer circumference when an even rotation scan is terminated. Furthermore, the double exposing forces the light spot to go selectively along first through fourth scanning lines TL1 to TL4 in order to form one track. The first scanning line TL1 is away from the outer circumference of the land track 21 toward an inner track by 1/4 track width, the second scanning line TL2 away from the outer circumference of the land track 21 toward the inner track by 3/4 track width, the third scanning line TL3 away from the outer circumference of the land 21 toward an outer track by 1/4 track width, and the fourth scanning line TL4 away from the outer circumference of the land track 21 toward the inner track by 5/4 track width. At the odd rotation scan, the light spot is sequentially irradiated on the third, second and first scanning lines TL3, TL2 and TL1 in repetition. Also, the light spot scans sequentially the first, second and fourth scanning lines TL1, TL2 and TL4 in repetition during the even rotation scan. For example, the light spot proceeds a path as shown in FIG. 8 when ith and i+1th tracks are formed. In detail, the light spot moves from a 2i−1th start point ST2i−1 toward the outer circumference by 1/2 track width and scans the third scanning line TL3, thereby forming the upper half portion of the groove header area GHD. When the light spot is arrived at the end point of the groove header area GHD, the light spot moves toward the inner circumference by one track width and is positioned on the second scanning line TL2. Then, the upper half portion of the land header area LHD is produced by the light spot. If the upper half portion of the land header area LHD had been completed, the light spot jumps by 1/2 track width toward the outer circumference and scans the first scanning line TL1, thereby forming the upper half portion of the land track 21. As described above, the light spot scans repeatedly the third, second and first scanning lines TL1, TL2 and TL3 until arriving at a 2i+1th start point ST2i+1. By performing the 2i−1th rotation scan, the upper half portions of the header areas HDZ and land tracks 21 for one track are patterned. When the upper half portion of ith track had been patterned, the light spot jumps by two track width toward the inner circumference to scan the first scanning line TL1, thereby producing the lower half portion of the groove header area GHD. When the light spot is arrived at the end point of the groove header area GHD, the light spot moves toward the inner circumference by one track width and is positioned on the fourth scanning line TL4. Then, the lower half portion of the land header area LHD is formed by the light spot. If the lower half portion of the land header area LHD had been formed, the light spot jumps by 1/2 track width toward the outer circumference and scans the second scanning line TL2, thereby forming the lower half portion of the land track 21. As described above, the light spot scans repeatedly the first, fourth and second scanning lines TL1, TL4 and TL2 until arriving at a 2i+2th start point ST2i+2. When the 2ith rotation scan had been terminated, the lower half portions of the header areas HDZ and land tracks 21 for one track are patterned. Also, the ith land and groove tracks 21 and 23 and the header areas 25 are patterned by the double rotation scan. After the 2ith rotation scan, the light spot moves toward the outer track by one track width and allows a 2i+1th rotation scan to be started. While the two rotation scan is performed, the light spot is switched according to an exposure pulse EPS as shown in FIG. 6. Referring to FIG. 6, the exposure pulse EPS has alternatively high and low logic values in the header area HDZ, whereas maintains only the high logic value in the recording area RZ. To this end, the light spot also is intermittently irradiated on the photo resist film corresponding to the header area HDZ, while continuously irradiated on the photo resist film relative to the recording area RZ. such a light spot irradiated on the photo resist film is switched, thereby providing the land and groove tracks 21 and 23 and the pre-pit train 25.

Figure 9:
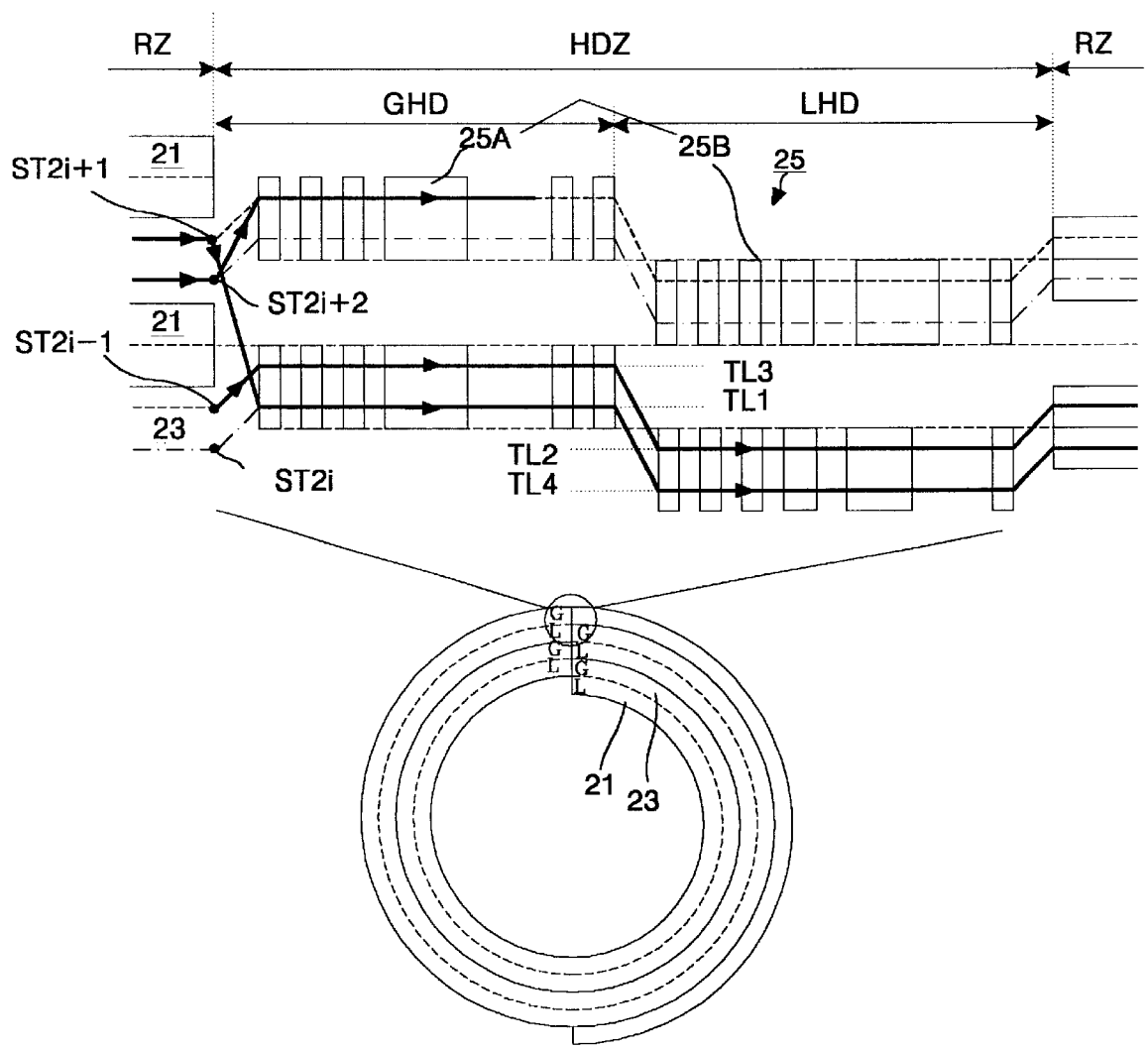
FIG. 9 shows the track structure of an optical disc according to still another embodiment of the present invention.
Figure 10:
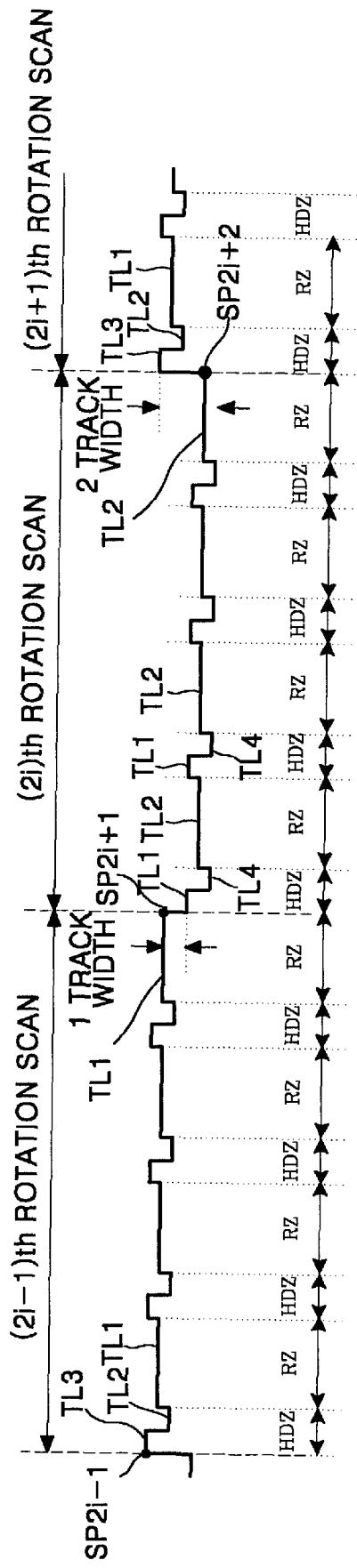
FIG. 10 explains a scanning path of a light spot to be irradiated on an exposure plane when the optical disc of FIG. 9 is fabricated.

FIG. 9 shows an optical disc according to still another embodiment of the present invention. The optical disc of FIG. 9 is utilized as the DVD-RAM. The optical disc of FIG. 9 includes land and groove tracks 21 and 23 forming one spiral track. All of the land and groove tracks 21 and 23 are utilized as a recording area RZ for recording a user information thereon. The land and groove tracks 21 and 23 are alternated each other by one rotation. Each the land and groove tracks 21 and 23 is alternated with a pre-pit train 25 in a track direction. The pre-pit train 25 consists of first pre-pit train 25A for the land track 21 and second pre-pit train 25B for the groove track 23. The first pre-pit train 25A is formed along an outer boundary line of the land track 21, while the second pre-pit train 25B is positioned along an inner boundary line of the land track 21. The first and second pre-pit trains 25A and 25B are used as a header area HDZ for indicating the physical position of the recording area RZ because of including an identification information representing the physical position of the land and groove tracks 21 and 23, i.e., the recording area RZ. In detail, an area including the first pre-pit train 25A is called as a groove header area GHD, and another area formed with the second pre-pit train 25B is called as a land header area LHD. In the pre-pit train 25, it is included pre-pits, such as first pre-pit 11 of FIG. 3, having a width larger than a length. In other words, the length of the pre-pit is short, while the width of the pre-pit is extended. To this end, all the land and groove tracks 21 and 23 on the optical disc of FIG. 9 has a high recording density. In order to fabricate such an optical disc, a double exposing is employed at the formation of a master disc. The double exposing allows a light spot to be scanned by two rotation at a photo resist film coated on a substrate, thereby forming land tracks 21 and pre-pit trains 25 for one track. The double exposing enables the light spot to move by 3/2 track width toward an inner circumference every time an odd rotation scan is terminated, and by 3/2 track width toward an outer circumference every time an even rotation scan is terminated, as shown in FIG. 9. Also, the double exposing allows the light spot to move by 1/2 track width toward outer circumference in the case that the light spot proceeds from the land track 21 into the groove header area GHD and from the land header area LHD into the land track 21. On the other hand, the light spot moves by 1 track width toward inner circumference when the light spot enters from the groove header area GHD into the land header area LHD. If the groove header area GHD is positioned ahead the recording area RZ, the double exposing enables the light spot to move by 1 track width toward an inner circumference every time an odd rotation scan is terminated, and by 2 track width toward an outer circumference every time an even rotation scan is terminated. Furthermore, the double exposing forces the light spot to go selectively along first through fourth scanning lines TL1 to TL4 in order to form one track. The first scanning line TL1 is away from the outer circumference of the land track 21 toward an inner track by 1/4 track width, the second scanning line TL2 away from the outer circumference of the land track 21 toward the inner track by 3/4 track width, the third scanning line TL3 away from the outer circumference of the land 21 toward an outer track by 1/4 track width, and the fourth scanning line TL4 away from the outer circumference of the land track 21 toward the inner track by 5/4 track width, respectively. To this end, the light spot is sequentially irradiated on the third, second and first scanning lines TL3, TL2 and TL1 in repetition at the odd rotation scan. Also, the light spot scans sequentially the first, fourth and second scanning lines TL1, TL4 and TL2 in repetition during the even rotation scan. For example, the light spot follows up a path as shown in FIG. 10 when ith and i+1th land tracks are formed. In detail, the light spot moves from a 2i−1th start point ST2i−1 toward the outer circumference by 2 track width and scans the third scanning line TL3, thereby forming the upper half portion of the groove header area GHD. When the light spot is arrived at the end point of the groove header area GHD, the light spot moves toward the inner circumference by one track width and is positioned on the second scanning line TL2. Then, the upper half portion of the land header area LHD is produced by the light spot. If the upper half portion of the land header area LHD had been formed, the light spot jumps by 1/2 track width toward the outer circumference and scans the first scanning line TL1, thereby forming the upper half portion of the land track 21. As described above, the light spot scans repeatedly the third, second and first scanning lines TL1, TL2 and TL3 until arriving at a 2i+1th start point ST2i+1. By performing the 2i−1th rotation scan, the upper half portions of the header areas HDZ and land tracks 21 for one track are patterned. When the upper half portion of ith track had been patterned, the light spot jumps by 1 track width toward the inner circumference to scan the first scanning line TL1, thereby producing the lower half portion of the groove header area GHD. When the light spot is arrived at the end point of the groove header area GHD, the light spot moves toward the inner circumference by one track width and is positioned on the fourth scanning line TL4. Then, the lower half portion of the land header area LHD is formed by the light spot. If the lower half portion of the land header area LHD had been formed, the light spot jumps by 1/2 track width toward the outer circumference and scans the second scanning line TL2, thereby forming the lower half portion of the land track 21. As described above, the light spot scans repeatedly the first, fourth and second scanning lines TL1, TL4 and TL2 until arriving at a 2i+2th start point ST2i+2. When the 2ith rotation scan had been terminated, the lower half portions of the header areas HDZ and land tracks 21 for one track are patterned. Also, the ith land and groove tracks 21 and 23 and the header areas 25 are patterned by the double rotation scan. After the 2ith rotation scan, the light spot moves toward the outer track by two track width and allows a 2i+1th rotation scan to be started. While the two rotation scan is performed, the light spot is switched according to an exposure pulse EPS as shown in FIG. 6. Referring to FIG. 6, the exposure pulse EPS has alternatively high and low logic values in the header area HDZ, whereas maintains only the high logic value in the recording area RZ. To this end, the light spot also is intermittently irradiated on the photo resist film corresponding to the header area HDZ, while continuously irradiated on the photo resist film relative to the recording area RZ. such a light spot irradiated on the photo resist film is switched, thereby providing the land and groove tracks 21 and 23 and the pre-pit train 25.

Figure 11:
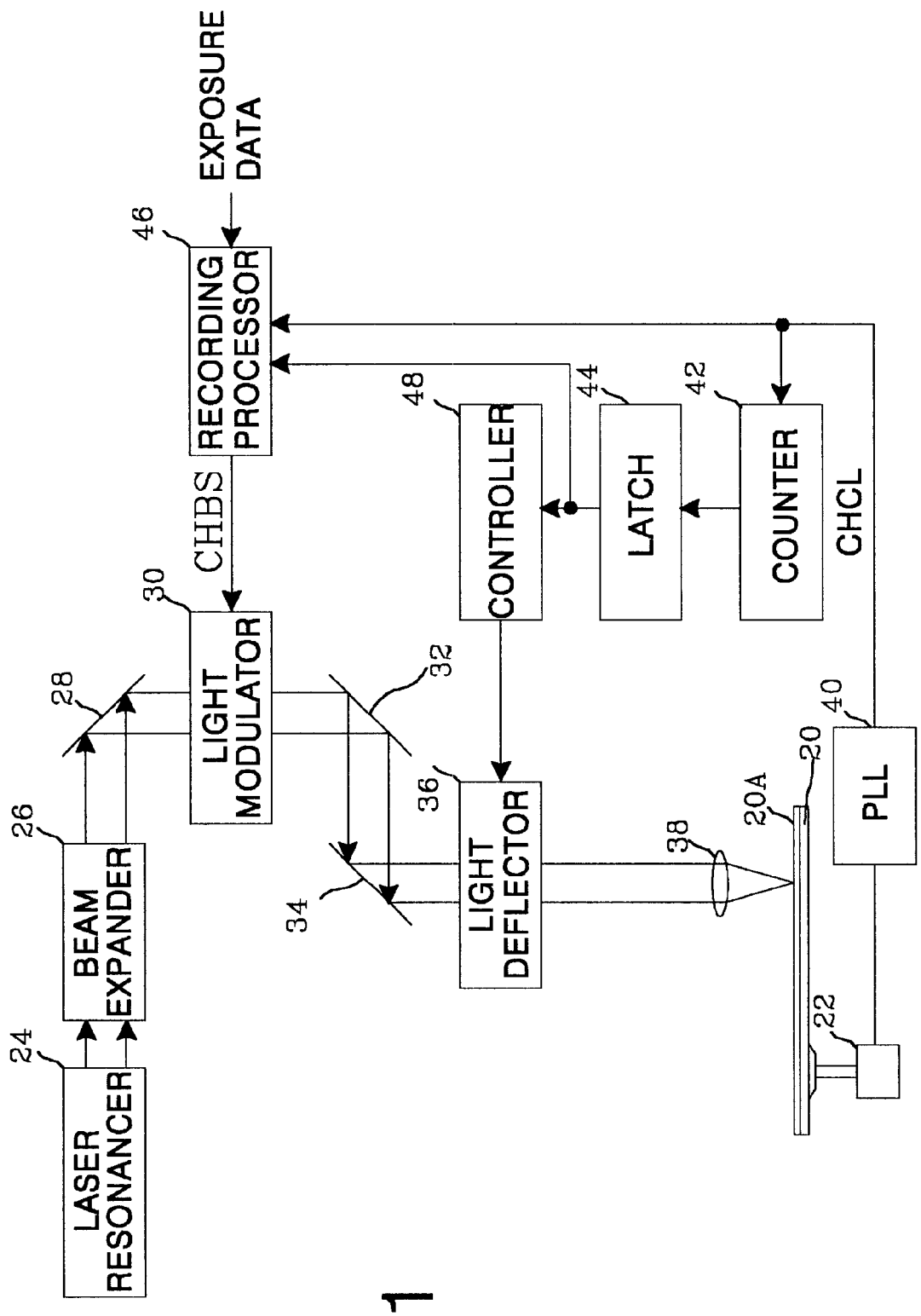
FIG. 11 is a schematic view of a fabricating apparatus for a master disc according to an embodiment of the present invention.

FIG. 11 illustrates an apparatus for fabricating a master disc according to an embodiment of the present invention. The apparatus of FIG. 11 includes a spindle motor 22 for rotating a substrate 20, and a beam expander 26, first reflective mirror 28, a light modulator 30, second reflective mirror 32, third reflective mirror 34, a light deflector 36 and an objective lens 38 arranged between a laser resonancer 24 and the substrate 20. The substrate 20 have a photo resist film 20A coated thereon. The spindle motor 22 generates a rotating clock having different period according to a rotating speed when the substrate 20 is rotated. To this end, the spindle motor 22 has a magnetic signal formatted on a rotating shaft thereof. The magnetic signal represents locations corresponding to a rotating angle of the rotating shaft. Also, the magnetic signal is converted into an electric signal by sensor (not shown) included in the spindle motor 22 to produce the rotating clock. The laser resonancer 24 generates a laser beam to be irradiated on the photo resist film 20A of the substrate 20. The laser beam generated in the laser resonancer 24 is expanded by the beam expander 26 to have a constant size of flux diameter. The first reflective mirror 28 reflects perpendicularly the laser beam from the beam expander 26 to the light modulator 30. The light modulator 30 switches the laser beam proceeding from the first reflective mirror 28 to the second reflective mirror 32 according to a channel bit stream CHBS. The second reflective mirror 32 reflects perpendicularly the laser beam from the light modulator 30 toward the third reflective mirror 34. The third reflective mirror 34 also reflects perpendicularly the laser beam from the second reflective mirror 32 toward the objective lens 38 through the light deflector 38. The light deflector 38 moves the laser beam in the diameter direction of the substrate 20. The objective lens 38 forces the laser beam from the light deflector 36 to be irradiated on the photo resist film 20A of the substrate 20 in the shape of a spot. Also, the master disc fabricating apparatus further includes a PLL (Phase Locked Loop) 40, a counter 42, a latch 44 and a controller 48 connected serially between the spindle motor 22 and light deflector 36, and a recording processor 46 for applying the channel bit stream CHBS to the light modulator 30. The PLL 40 frequency-multiplies the rotating clock from the spindle motor 22 to generate a channel clock CHCL. The channel clock CHCL generated in the PLL 40 is applied to the counter 42 and the recording processor 46. The counter 42 counts the channel clock CHCL to output an overflow signal every time the substrate 20 is rotated by one rotation. The latch 44 inverts an output signal thereof every time of receiving the overflow signal, thereby producing a rotating information signal. The rotating information signal indicates whether the substrate 20 have rotated in odd number or even number. Also, the rotating information signal is applied to the recording processor 46 and the controller 48. The controller 48 controls the light deflector 36 in response to the rotating information signal and enables the laser beam to be moved on the photo resist film 20A by 1/2 track width toward inner or 3/2 track width toward the outer circumference every one rotation, as shown in FIG. 5. In detail, the controller 48 allows the laser beam to be moved by the 1/2 track width toward outer circumference when the rotating information signal has a logical value of "0", i.e., when the substrate 20 have rotated in add number. Therefore, the upper half portion of the header area HDZ and the land track 21 are formed. Whereas, if the logical value of the rotating information signal is "1", i.e., when the substrate 20 have rotated in even number, the controller 48 forces the laser beam to be moved by the 3/2 track width toward the outer circumference. Then, the lower half portion of the header area HDZ and the land track 21 are formed. On the other hand, the recording processor 46 converts an exposure data into the channel bit stream CHBS and supplies the channel bit stream CHBS to the light modulator 30 in such a manner of being synchronized with the channel clock CHCL from the PLL 40. Also, the recording processor 46 re-applies the channel bit stream CHBS for one rotation in response with the rotating information signal from the latch 44 to write twice an equal exposure data on the photo resist film 20A. In detail, the recording processor 46 applies a new channel bit stream CHBS to the light modulator 30 in the case that the rotating information signal has the logical value of "0", while previous channel bit stream CHBS to the light modulator 30 when the logical value of the rotating information signal is "1". The channel bit stream generated in the recording processor 46 includes an information for the physical location of the recording area RZ because the exposure data has a location information representing the physical location of the recording area RZ. Since the channel bit stream having the location information is repeated by an amount for one rotation and the laser beam at even rotation scan is adjacent to the laser beam at add rotation scan, the pre-pit having a width larger than a length can be formed on the photo resist film 20A. As a result, the master disc fabrication apparatus allows the optical disc, as shown in FIG. 4, having a high recording density to fabricate.

Figure 12:
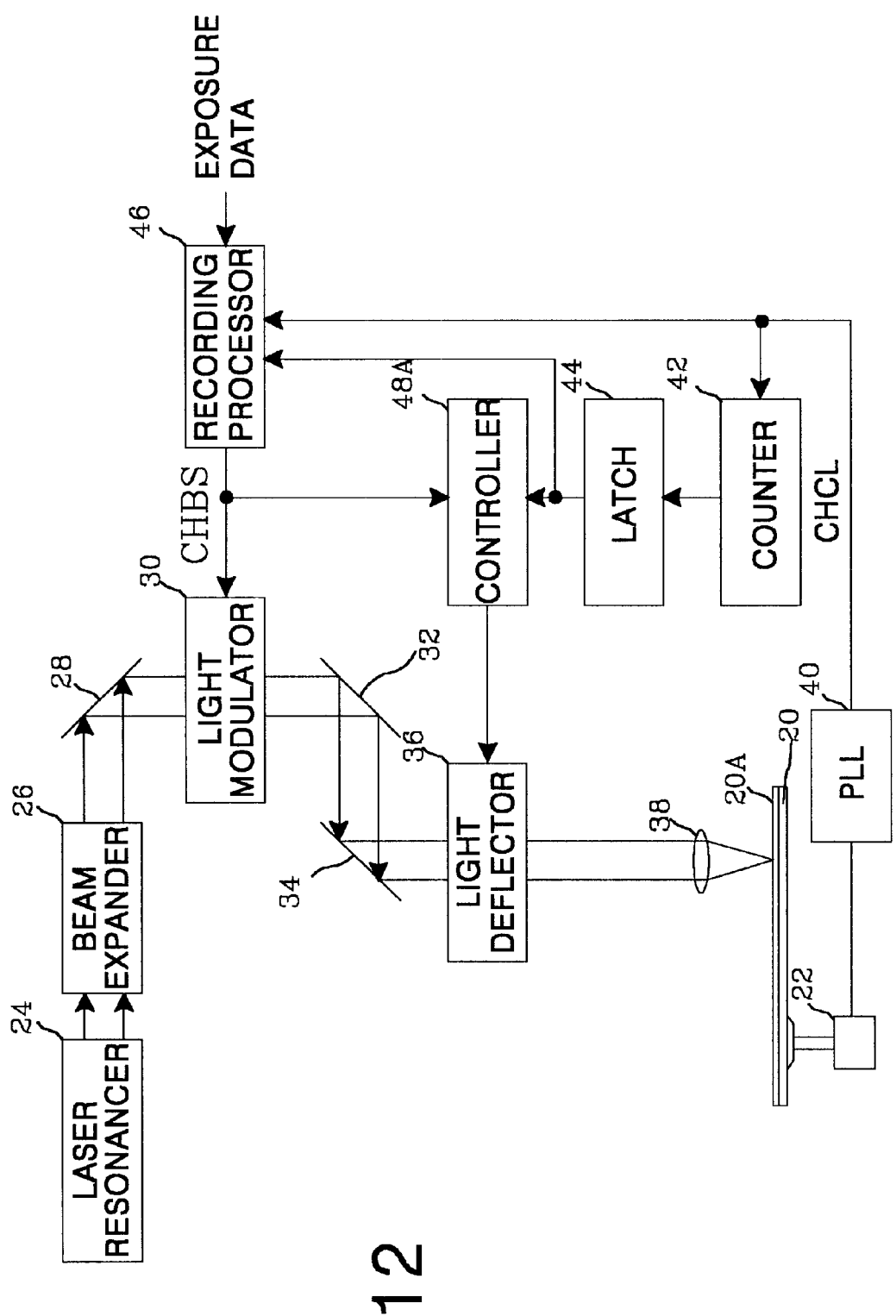
FIG. 12 is a schematic view of a fabricating apparatus for a master disc according to another embodiment of the present invention.

FIG. 12 shows an apparatus for fabricating an optical disc according to another embodiment of the present invention. The apparatus of FIG. 12 is similar to that of FIG. 11. There is a difference that a controller 48A further is connected to the recording processor 46 as well as the light deflector 36 and the latch 44. In the fabricating apparatus of FIG. 12, the controller 48A controls the light deflector 36 in response to the rotating information signal and forces the laser beam to move on the photo resist film 20A by the 5/2 or 3/2 track width toward inner or the 3/2 or 1/2 track width toward the outer circumference every one rotation. In detail, the controller 48A allows the laser beam to be moved by the 1/2 or 3/2 track width toward outer circumference when the rotating information signal has a logical value of "0", i.e., when the substrate 20 have rotated in add number. Therefore, the upper half portion of the land track 21 is formed. Whereas, if the logical value of the rotating information signal is "1", i.e., when the substrate 20 have rotated in even number, the controller 48A forces the laser beam to move by the 5/2 or 3/2 track width toward the inner circumference. Then, the lower half portion of the land track 21 is formed. Also, the controller 48A controls the light deflector 36 in response to the channel bit stream CHBS and forces the laser beam to move on the photo resist film 20A by one track width toward inner or 1/2 track width toward the outer circumference. In detail, the controller 48A allows the laser beam to move by one track width toward outer circumference for the land track 21, by 1/2 track width toward the inner circumference for the land header area LHD. In other words, the controller 48A moves the laser beam as shown in FIGS. 8 and 10. As a result, the master disc fabricating apparatus allow the optical disc to be fabricated as shown in FIGS. 7 or 9.

Figure 13:
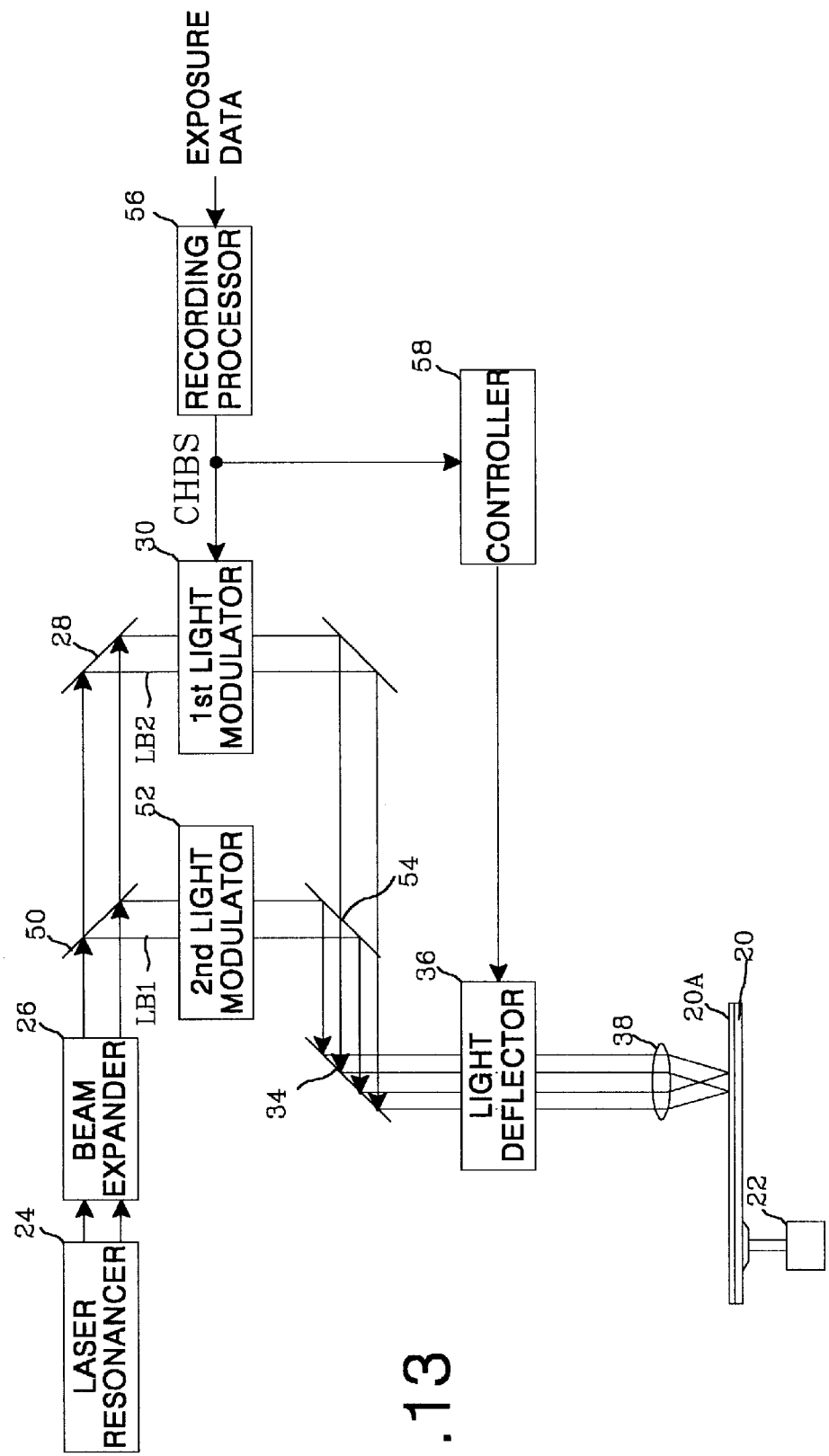
FIG. 13 is a schematic view of a fabricating apparatus for a master disc according to still another embodiment of the present invention.

FIG. 13 illustrates an apparatus for fabricating a master disc according to still another embodiment of the present invention. The apparatus of FIG. 13 includes a spindle motor 22 for rotating a substrate 20, and a beam expander 26, first reflective mirror 28, first light modulator 30, second reflective mirror 32, third reflective mirror 34, a light deflector 36 and an objective lens 38 arranged between a laser resonancer 24 and the substrate 20. The substrate 20 have a photo resist film 20A coated thereon. The laser resonancer 24 generates a laser beam to be irradiated on the photo resist film 20A of the substrate 20. The laser beam generated in the laser resonancer 24 is expanded by the beam expander 26 to have a constant size of flux diameter. The first reflective mirror 28 reflects perpendicularly the laser beam from the beam expander 26 to the first light modulator 30. The first light modulator 30 switches the laser beam proceeding from the first reflective mirror 28 to the second reflective mirror 32 according to a channel bit stream CHBS. The second reflective mirror 32 reflects perpendicularly the laser beam from the first light modulator 30 toward the third reflective mirror 34. The third reflective mirror 34 also reflects perpendicularly the laser beam from the second reflective mirror 32 toward the objective lens 38 through the light deflector 36. The light deflector 36 moves the laser beam in the diameter direction of the substrate 20. The objective lens 38 forces the laser beam from the light deflector 36 to be irradiated on the photo resist film 20A of the substrate 20 in the shape of a spot. Also, the master disc fabricating apparatus further includes first half mirror 50, second light modulator 52 and second half mirror 54 forming an sub-light path to be connected a path proceeding from the first reflective mirror 28 to the second reflective mirror 32 through the first light modulator 30. Furthermore, the master disc fabricating apparatus has a controller 58 connected between a recording processor 56 and the beam deflector 36. The first half mirror 50 transmits a part of the laser beam from the beam expander 26 to the first reflective mirror 28 and reflects perpendicularly the rest to the second beam modulator 52. The second light modulator 52 responds to the channel bit stream CHBS and switches the laser beam (hereinafter, the sub laser beam) proceeding from the first half mirror 50 to the second half mirror 54. The second half mirror 54 reflects perpendicularly the sub laser beam from the second light modulator 52 to the third reflective mirror 34. Also, the second half mirror 54 transmits the laser beam (hereinafter, the main laser beam) from the second reflective mirror 32 to the third reflective mirror 34. To this end, the third reflective mirror 34 reflects perpendicularly all of the main and sub laser beams toward the light deflector 36. The main and sub laser beams are respectively converged by the objective lens 38 and are irradiated on the photo resist film 20A in shape of main and sub light spots. All of the light spots have a diameter corresponding to 1/2 track width. The main light spot is irradiated at lower half portion of a track and the sub light spot is positioned at upper half portion of the track. Therefore, the upper pre-pits 11A, 13A, 15A and 17A and the lower pre-pits 11B, 13B, 15B and 17B as shown in FIG. 3 are simultaneously formed. Also, the upper and lower portions of the land track 21 are simultaneously obtained. The recording processor 56 converts an exposure data into the channel bit stream CHBS and supplies the channel bit stream CHBS to the first and second light modulator 30 and 52 and the controller 58. The controller 58 controls the light deflector 36 in response to the channel bit stream CHBS and forces the main and sub light spots to move on the photo resist film 20A by one track width toward inner or by 1/2 track width toward the outer circumference. In detail, the controller 58 allows the main and sub light spots to move by 1/2 track width toward outer circumference for the land track 21 and the groove header area GHD, and by one track width toward the inner circumference for the land header area LHD. As a result, the pre-pit, as shown in FIG. 3, having a width larger than a length can be formed on the photo resist film 20A. Also, the master disc fabricating apparatus allow the optical disc to be fabricated as shown in FIGS. 7 or 9.

Such a master disc fabricating apparatus of FIG. 13 forces light spots to be irradiated simultaneously on both the upper and lower half portions of a track such that the pre-pits and the land track can be formed by single rotation scan. Also, the fabricating apparatus of FIG. 13 can reduce a fabricating time of the master disc at 1/2 relative to that of FIGS. 11 or 12.

In methods for fabricating optical discs as shown in FIGS. 4, 7 and 9, if the start point of the rotation scan is changed, i.e., in the case that the add rotation scan starts at SP2i instead of SP2i–1, the jumping width of the light spot can be varied. Also, the land and groove tracks 21 and 23 shown in FIGS. 7 and 9 can be wobbled. In order to form the wobbled tracks, the light deflector 36 included in the apparatuses of FIGS. 11 to 13 allows the laser beam to move in the width direction of the track according to the amplitude of a wobbled signal.

As described above, in the optical disc according to the present invention, pre-pits each having a width larger than a length are formed such as a recording density is higher. The method and apparatus for fabricating master disc according to the present invention allows the photo resist film to be expose to a laser beam at least twice or to multiple laser beams, thereby forming pre-pits each having a constant width. Therefore, the method and apparatus according to the present invention provides with an optical disc having a high modulation degree at the reproducing. Furthermore, the method and apparatus according to the present invention can be provide a high recording density of optical disc because pre-pits are formed in such a manner that the width is larger than the length.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a master disc, comprising the steps of:

providing a substrate;

forming a photo resist film on the substrate; and exposing repeatedly the photo resist film at least twice to form one track on the substrate, said exposing step including generating laser lights and moving an axis of the laser lights toward at least one of an inner and an outer circumference each time the substrate is rotated once.

2. The method as claimed in claim 1, wherein the exposing step exposes the photo resist film corresponding to the position of a pit to be formed on the track.

3. The method as claimed in claim 1, wherein the exposing step exposes the photo resist film corresponding to the positions of a pit and a groove to be formed on the track.

4. The method as claimed in claim 1, wherein the exposing step further comprises switching the laser lights according to a channel bit stream to be recorded on the substrate.

5. A master disc being formed by the method as claimed in claim 1.

6. A method of fabricating an optical disc from a master disc produced by the method as claimed in claim 1, comprising the steps of:

transcribing the master disc to provide a stamper; and molding a disc substrate using the stamper.

7. An optical disc being produced by the method as claimed in claim 6.

8. A method of fabricating a master disc, comprising the steps of:

providing a substrate;

forming a photo resist film on the substrate; and exposing simultaneously the photo resist film to at least two lights at the same depth on the substrate to form one track on the substrate.

9. The method as claimed in claim 8, wherein the exposing step comprises steps of:

generating a laser light;

forming a channel bit stream from an exposure data;

separating at least one sub light from the laser light;

switching the laser light and the at least one sub light in response with the channel bit stream;

overlapping the laser lights and the at least one sub light in part to unite paths of the at least one sub light and laser light; and moving axes of the at least one sub light and the laser light toward any one of an inner and an outer circumference on the substrate responding to the channel bit stream.

10. An apparatus for fabricating a master disc, comprising exposing means for repeatedly performing an exposure of a photo resist film at least twice to form one track, said exposure being performed toward at least one of an inner and an outer circumference.

11. The method as claimed in claim 10, wherein said exposing means exposes the photo resist film corresponding to a position of a pit to be formed on the track.

12. The method as claimed in claim 10, wherein the exposing means exposes the photo resist film corresponding to the positions of a pit and a groove to be formed on the track.

13. An apparatus for fabricating a master disc, comprising:

light means for generating laser lights;

processing means for forming a channel bit stream from an exposure data;

modulating means for switching the laser lights in response with the channel bit stream;

information generating means for obtaining a rotating information in accordance with the rotation of the substrate; and light deflective means for moving the axis of the laser lights toward at least one of an inner and an outer circumference on the substrate responding to the rotating information.

* * * * *